United States Patent [19]
Wilkinson

[11] 4,036,817
[45] July 19, 1977

[54] DIRECTION INDICATOR SWITCH
[75] Inventor: Norman Wilkinson, Higherford, near Nelson, England
[73] Assignee: Lucas Electrical Company Limited, Birmingham, England
[21] Appl. No.: 596,144
[22] Filed: July 15, 1975
[30] Foreign Application Priority Data
  July 17, 1974   United Kingdom ............ 31567/74
[51] Int. Cl.² ............................................. H01H 3/16
[52] U.S. Cl. ............................ 200/61.27; 200/61.3; 200/61.34
[58] Field of Search ............... 200/61.27, 61.38, 61.54
[56] References Cited
U.S. PATENT DOCUMENTS
3,914,566   10/1975   Wendling ................ 200/61.27

Primary Examiner—James R. Scott

[57] ABSTRACT

A direction indicator switch having a body, a rotor, and detent means on the body and the rotor for releasably retaining the rotor in any one of a rest, and first and second operative positions. A detent release member is movable with the rotor and is also movable relative to the rotor to release the detent means, and carried by the body is a pawl. The pawl is resiliently urged towards a projecting position wherein the pawl intersects the orbit of a striker rotating with the vehicle steering shaft. The pawl is capable of movement relative to the body about first and second spaced parallel axes, and is permitted to move to its projecting position when the rotor of the switch is moved to either of its first or second operative positions. During cancelling movement the pawl is moved by the striker, and in turn co-operates with the detent release member to release the detent mechanism and thus to permit the rotor to be moved back to its central rest position by an inherent spring bias.

2 Claims, 5 Drawing Figures

DIRECTION INDICATOR SWITCH

BACKGROUND OF THE INVENTION

This invention relates to a direction indicator switch for a road vehicle.

SUMMARY OF THE INVENTION

A direction indicator switch includes a body and a rotor mounted for rotational movement relative to the body about a first axis. The rotor rotates between a central rest position and first and second operative positions on opposite sides, respectively, of the central rest position. Detents are provided on the body and the rotor for resiliently retaining the rotor in one of the rest, first or second positions. A detent release member is movable relative to the rotor for releasing the detents. A pawl is provided which is resiliently urged towards a position so that it projects into the orbit of a striker rotating with the vehicle steering shaft. The pawl is moved into the striker orbit when the rotor is moved to either its first or its second operative position. When in this projecting position the pawl is capable of pivoting relative to the body about either of a pair of spaced parallel axes. The pawl further includes parts co-operable with the detent release member whereby when the rotor is in one of the operative positions, the pawl is moved about one of said pair of axes by a cancelling movement of the striker. Upon such movement the pawl parts move the detent release relative to the rotor releasing the rotor from the detents and freeing it for movement back to the central rest position to which it is resiliently biased

BRIEF DESCRIPTION OF THE DRAWINGS

One example of the invention is illustrated in the accompanying drawings wherein.

DETAILED DESCRIPTION OF A PREFERRED EMBODIMENT

Figure 1:
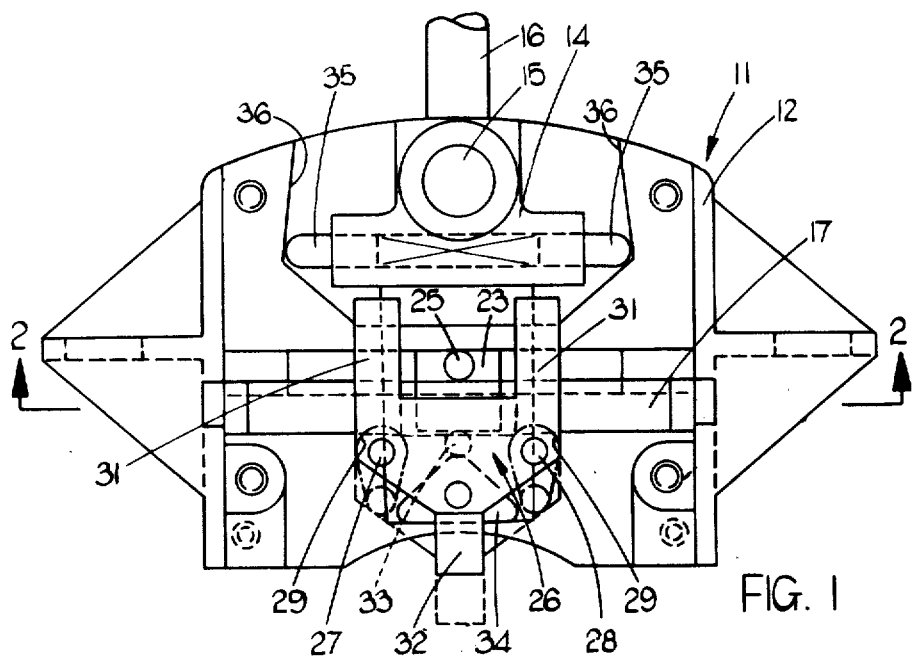
FIG. 1 is a plan view of a direction indicator switch with parts thereof omitted for clarity.
Figure 2:
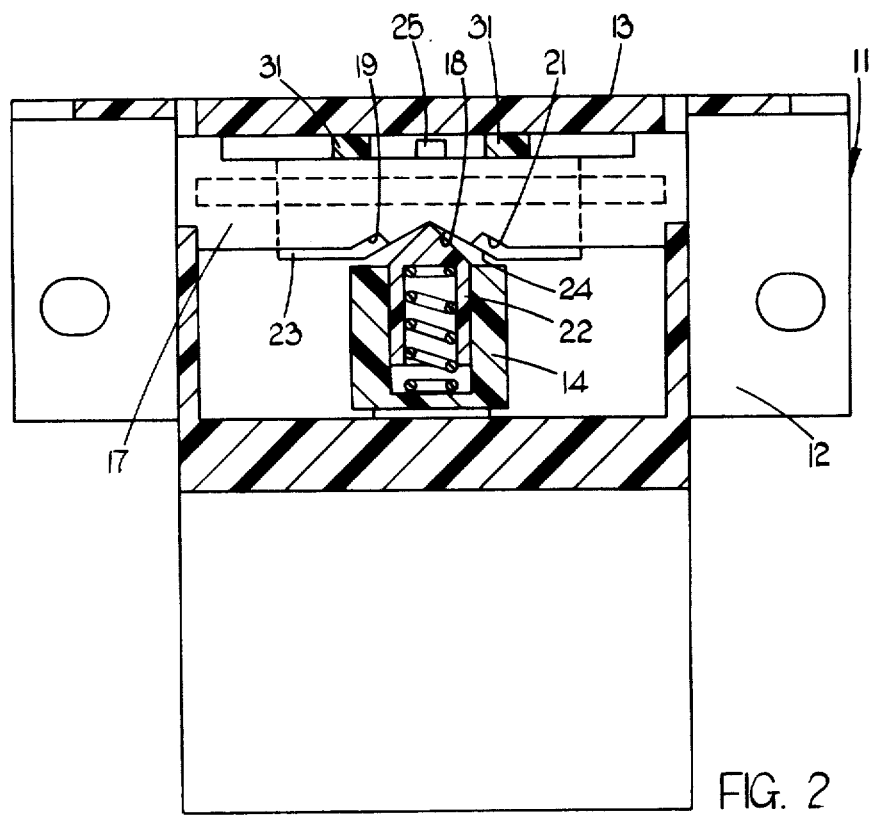
FIG. 2 is a sectional view on the line 2—2 in FIG. 1.
Figure 3:
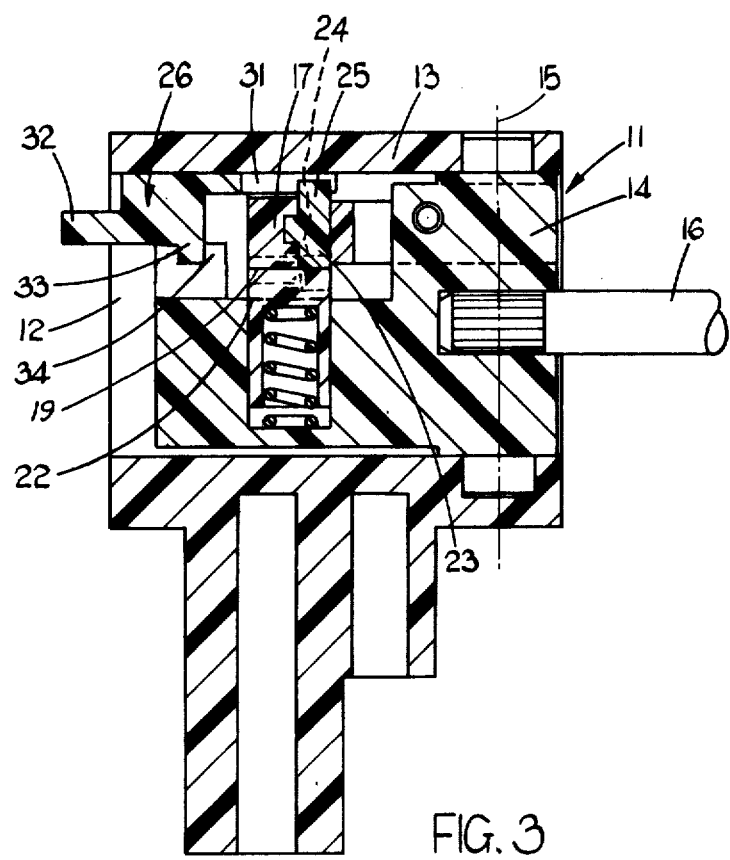
FIG. 3 is a sectional view of the switch shown in FIG. 1 on a line generally at right angles to the section of FIG. 2, but showing the parts in an operative position rather than the rest position as shown in FIGS. 1 and 2.
Figure 4:
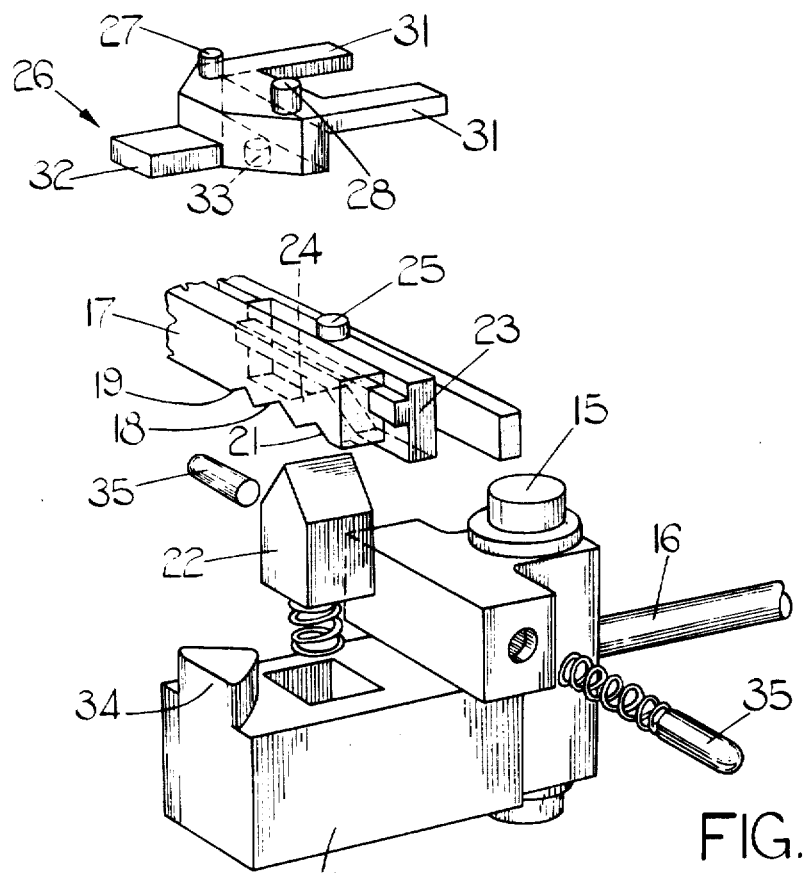
FIG. 4 is an exploded view of the switch shown in FIG. 1.
Figure 5:
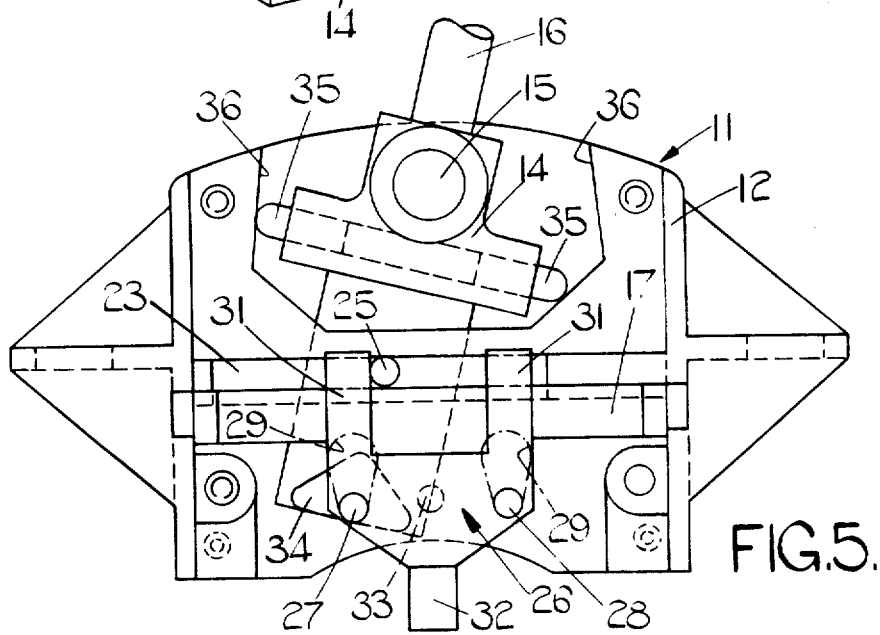
FIG. 5 is a plan view of the switch of FIG. 1 in an operative position.

Referring to the drawings, the direction indicator switch which is intended for use in a road vehicle, comprises a body 11 defined by a moulded synthetic resin base 12 an open upper end of which is closed in use by a moulded synthetic resin cover plate 13. Pivotally mounted in the body 11 for movement about an axis shown at 15 is a moulded synthetic resin rotor 14. Projecting from the rotor 14 is an operating lever 16 whereby the rotor can be moved relative to the body 11 about the axis 15. The rotor 14 lies within a recess of the base 12 and a bridge 17 carried by the base 12 overlies part of the rotor 14 on the opposite side of the axis 15 from the lever 16. The surface of the bridge 17 presented to the rotor 14 is formed with a centrally disposed V-shaped notch 18 flanked on either side by shallower notches 19, 21 respectively. A spring pressed plunger 22 carried by the rotor 14 is resiliently urged into engagement with the cam form defined by the notches 18, 19, 21, an end region of the plunger 22, of triangular cross section, engaging in one or other of the three notches, and the cam form and plunger together defining detent means for retaining the rotor in any one of three angular positions about the axis 15 relative to the body. The deeper notch 18 defines the central, rest position of the rotor while the notches 19, 21 define first and second operative positions respectively of the rotor on opposite sides respectively of the central rest position.

Slidable along the length of the bridge 17 is a detent release slider 23 the slider 23 being formed with a V-shaped notch 24 which is engaged by the plunger 22. Thus it will be understood that as the rotor 14 is moved relative to the bridge 17 then the action of the plunger 22 in the notch 24 of the slider 23 causes the slider 23 to move along the bridge in company with the rotor 14. A face of the slider 23 remote from the plunger 22 is provided with an upstanding peg 25.

Supported by the body 11 adjacent the bridge 17 is a pawl 26. The pawl 26 is shown in FIG. 1, in solid lines, in its rest position and in broken lines in an operative position. The pawl is mounted for pivotal, and longitudinal movement relative to the body 11 by means of a pair of parallel posts 27, 28 upstanding from the pawl which engage in corresponding slots 29 in the cover 13. (Although the cover 13 is not shown in FIG. 1 the outline of the slots 29 is shown for convenience). The pawl 26 is provided at one end with a pair of parallel arms 31 which overlie the bridge 17, and between which extends the peg 25 of the slider 23. At its opposite end the pawl includes an integral finger 32 which projects forwardly of the body 11, towards the steering shaft of the vehicle in which the switch is utilized. A pair of compression springs (not shown) acting between the pivot post 27 of the pawl and the cover member 13 urge the pawl 26 towards the axis of the steering column with which the switch is utilized. However, in the central rest position of the rotor 14 a peg 33 on the pawl abuts an apex of a triangular form 34 on the rotor 14, the triangular form 34 thus preventing forward movement of the pawl relative to the body under the action of the compression springs. Thus in the rest position of the switch the pawl is held by the rotor against the compression springs and the finger 32 of the pawl thus lies outside the orbit of a striker moving with the steering shaft of the vehicle.

The rotor 14 is provided with a pair of oppositely directed spring loaded plungers 35 each of which engages the surface of a respective V-shaped recess 36 in the base 12. In the central rest position of the rotor 14 the plungers 35 engage the apices of their respective recessess 36, and thus any movement of the rotor away from its central rest position compresses the spring associated with the plungers 35 and the spring together with the plungers 35 and recesses 36 provide a centering action tending always to restore the rotor to its central rest position.

Electrical contacts are associated with the rotor 14 and the base 12 and these contacts and their manner of operation are of known form and form no part of this invention. In respect of the contacts it is sufficient to say that the contacts are such that in the first operative position of the rotor a first electrical circuit is completed, while in the second operative position of the rotor a second electrical circuit is completed both circuits being broken in the central position of the rotor, and the first and second circuits being associated with direction indicator lamps on opposite sides of the associated vehicle respectively.

OPERATION OF THE INVENTION

Assuming the switch to be in an off condition, then the rotor 14 is in its central rest position, the pawl 26 is in a retracted position, and the peg 25 lies midway between the arms 31 of the pawl. In order to achieve the first operative position of the switch the rotor is pivoted about the axis 15 in a clockwise direction and the plunger 22 moves relative to the bridge 17 disengaging from the notch 18 and engaging in the notch 19. The strength of the spring associated with the plunger 22 is sufficient to ensure that the rotor is retained by the action of the plunger in the notch 19 against the action of the centralizing force derived from the spring associated with the plungers 35. The notch 24 is aligned with the notch 18 and the notches are of similar angle. Thus the slider 23 will not be moved with the rotor by the plunger 22 until the plunger 22 has cleared the apex between notches 18 and 19, whereupon the slider is moved rapidly by the action of the plunger 22 seating in the notch 19. The movement of the slider moves the peg 25 to a position touching, or closely adjacent, the left-hand arm 31 of the pawl 26. Additionally, the movement of the rotor moves the triangular form 34 relative to the peg 33 of the pawl thus permitting the pawl to move forward under the action of its compression springs and allowing the finger 32 to achieve a position intersecting the orbit of the striker of the steering shaft of the vehicle. Thus the plunger 22 retains the rotor 14 in its first operative position, the first electrical circuit being completed by way of the contacts of the switch. When the turn indicated has been completed the steering column is rotated in a direction to return the vehicle to a straight course, and the striker rotating with the steering column abuts the finger 32 and so causes the pawl to pivot about the axis of the pivot post 28. It will be appreciated that the pawl could not pivot about the post 27 since the posts 27, 28 are at the forward ends of their respective slots 29 and thus the forward end of the slot associated with the post 28 prevents pivotal movement of the pawl in a clockwise direction about the axis of the post 27. However, when the pawl pivots about the axis of the post 28 then the post 27 can ride back along the length of its respective slot 29, against the action of the associated compression spring. Pivotal movement of the pawl 26 about the axis of post 28 causes the left-hand arm 31 to move generally towards the centre line of the switch. Thus the slider 23 is moved back towards the central position by virtue of the engagement of the arm 31 with the peg 25 of the slider 23. However, the rotor is at this stage held in its operative position by the plunger 22 and thus the slider 23 moves relative to the rotor. The movement of the slider 23 relative to the rotor 14 causes one of the inclined walls of the notch 24 in the slider 23 to move relative to the plunger 22, there being a scissor action between the wall of the notch 24 and the opposite wall of the notch 19 resulting in depression of the plunger 22 against the action of its associated compression spring. This movement of the plunger 22 withdraws the triangular end of the plunger 22 from the notch 19 in the bridge 17 towards the apex separating notches 19, 18 and thus releasing the detent action and permitting the rotor to return to its central rest position under the action of the plungers 35. As the plunger 22 clears the apex and enters notch 18 its spring loading aids plungers 35 in returning the rotor. During the last portion of the return movement of the rotor 14 to its central position the slider 33 moves with the rotor by virtue of the engagement of the plunger 22 in the apex of the notch 24.

Return movement of the rotor to its central rest position is accompanied by retraction of the pawl 26 against the action of its respective compression springs. The retraction of the pawl is effected by the co-operation of the triangular form 34 on the rotor and the peg 33 on the pawl. It will be recalled that the movement of the triangular form during pivoting movement of the rotor permitted the pawl to move to its forward position. During return movement of the rotor the peg 33 rides along one of the faces of the triangular form, and a retracting movement of the pawl results.

Movement of the rotor to, and cancelling of the rotor from the second operative position is substantially identical to that described above with reference to the first operative position, with of course the exception that the plunger 22 engages the notch 21 in the bridge 17, and during cancelling the pawl pivots in a counterclockwise direction about the axis of the post 27 the right hand arm 31 engaging the peg 25.

During negotiation of the turn which is being indicated the striker of course moves in the opposite direction to the cancelling direction and strikes the finger 32 of the pawl in so doing. However, the switch is not cancelled by engagement of the finger 32 by the striker in this situation since the pawl will be pivoted about one or other of the posts depending on which operative position is selected, in a direction to move the appropriate arm 31 away from the centre line of the switch, and therefore away from the peg 25.

In the event that the rotor 14 is manually retained in either of its operative positions during cancelling movement of the striker then the pawl 26 and slider 23 move as during a normal cancelling sequence, and the detent plunger 22 is depressed as before. However, the rotor does not move back towards its central position when released, and so immediately the striker moves beyond the finger 32 the pawl springs back to its operative position under the action of its compression springs, and the slider 23 is returned to its operative position by the action of the spring loaded plunger 22 returning to a position engaging either the notch 19 or the notch 21.

I claim:
1. A turn signal indicator mechanism for a road vehicle, said vehicle including a steering wheel with a striker moving in a fixed orbit in response to rotation of the steering wheel, said mechanism comprising:
   a fixedly mounted body;
   a rotor mounted on said body and rotatably movable between a central rest position and first and second operative positions disposed on either side of said central rest position;
   detent means, mounted on said body and rotor, for resiliently retaining said rotor in one of said positions;
   a detent release member, movable with respect to said detent means, for releasing said detent means; and
   pawl means, responsive to said rotor and urged into the orbit of said striker only when said rotor is in one of said operative positions, for operating said detent release member when struck by said moving striker, said pawl means comprising, means for moving about one of a pair of spaced parallel axes, which of said axes being determined by the position of said rotor, means for projecting a portion of said pawl into the orbit of said striker when said rotor is in one of said operative positions, and means for engaging said detent release member.
2. A switch as claimed in claim 1, wherein said mechanism further includes means for resiliently biasing said rotor towards said central rest position.

* * * * *